United States Patent [19]

Watkins

[11] Patent Number: 4,604,895
[45] Date of Patent: * Aug. 12, 1986

[54] HOT WIRE ANEMOMETER

[75] Inventor: Dennis W. Watkins, King County, Wash.

[73] Assignee: Air Sensor Inc., Seattle, Wash.

[*] Notice: The portion of the term of this patent subsequent to Jun. 18, 2002 has been disclaimed.

[21] Appl. No.: 711,090

[22] Filed: Mar. 12, 1985

Related U.S. Application Data

[63] Continuation of Ser. No. 490,560, May 2, 1983, Pat. No. 4,523,461.

[51] Int. Cl.⁴ ............................................... G01F 1/68
[52] U.S. Cl. ...................................................... 73/204
[58] Field of Search ..................... 73/27 R, 118 A, 204

[56] References Cited

U.S. PATENT DOCUMENTS

| | | |
|---|---|---|
| 2,104,649 | 1/1938 | Hinton . |
| 2,753,247 | 7/1956 | Greanias et al. ............... 73/27 R X |
| 3,363,463 | 1/1968 | Wheeler ................... 73/204 |
| 3,680,532 | 8/1972 | Omori . |
| 3,702,566 | 11/1972 | Obermaier et al. ..................... 73/204 |
| 3,747,577 | 7/1973 | Mauch et al. . |
| 3,749,070 | 7/1973 | Oishi et al. . |
| 3,796,198 | 3/1974 | Mauch et al. . |
| 3,812,830 | 5/1974 | Traisnel . |
| 3,999,525 | 12/1976 | Stumpp et al. . |
| 4,154,087 | 5/1979 | Schunk et al. ..................... 73/204 X |
| 4,184,460 | 1/1980 | Harada et al. . |
| 4,193,300 | 3/1980 | Peter . |
| 4,205,377 | 5/1980 | Oyama et al. . |
| 4,232,647 | 11/1980 | Van Siclen, Jr. . |
| 4,264,961 | 4/1981 | Nishimura et al. . |
| 4,304,128 | 12/1981 | Hafner et al. ......................... 73/204 |
| 4,523,461 | 6/1985 | Watkins ............................... 73/204 |

FOREIGN PATENT DOCUMENTS 0018563 8/1915 United Kingdom ................ 73/204

OTHER PUBLICATIONS

A World of Application-Kurz Instruments, Inc.
Review of Scientific Instruments—1979, pp. 152, 514 and 515.
The Theory and Application of Sensor—Chinese publication, Chuan-hua Scientific and Technical Books, Co.

Primary Examiner—Charles A. Ruehl
Attorney, Agent, or Firm—Seed and Berry

[57] ABSTRACT

An electronic anemometer for measuring air mass flow in a conduit having a straight length of temperature-dependent resistive wire; a circuit board for holding at least a portion of the electronic circuitry used when the anemometer is operating to maintain the wire at a substantially constant temperature and generate an air mass flow-indicating signal based upon the air mass flow in the conduit sampled by the wire, the circuit board being mountable on the exterior of the conduit; a rigid support plate having a pair of spaced-apart openings, the plate being fixedly attached to the circuit board; a pair of electrically nonconductive support inserts, each of the inserts being fixedly retained within one of the openings in the support plate; and a pair of electrically conductive, resilient posts capable of withstanding the elevated operating temperatures encountered when the anemometer is operating, each of the posts having a wire-supporting end portion fixedly connected to the wire, the end portions being spaced apart and positioned in a central portion of the conduit with the wire substantially transverse to the direction of airflow therein, the end portions being biased away from each other to hold the wire under tension, each of the posts further having a remote end portion extendable through an opening in the wall of the conduit and fixedly held by one of the support inserts, the remote end portions being electrically connected to the electronic circuitry.

10 Claims, 3 Drawing Figures

AIR MASS FLOW-
INDICATING SIGNAL

HOT WIRE ANEMOMETER

This application is a continuation of U.S. Pat. application Ser. No. 490,560, filed May 2, 1983, now U.S. Pat. No. 4,523,461.

TECHNICAL FIELD

The present invention relates generally to anemometers, and more particularly, to a hot wire electronic anemometer.

BACKGROUND ART

It is often necessary or useful to know the mass of air flowing through a passageway. While there are many applications for an anemometer or air mass sensor, an application of particular interest is in an internal-combustion engine. For an automobile engine with electronic fuel injection and ignition systems, air mass flow into the engine is one of several important sensed conditions useful in generating an electrical signal which controls and optimizes performance of those systems.

One type of conventional air mass sensor utilizes a temperature-dependent resistive wire, such as platinum wire, having an electrical resistance proportional to its temperature. The resistive wire is placed in the air mass flow of a passageway, and an electrical circuit supplies electric current to the wire. The circuit automatically regulates the flow of current through the resistive wire to maintain its resistance and hence its temperature constant, and measures that current. The measured current (or a voltage proportional thereto) indicates the quantity of air per unit of time flowing through the passageway, and is used by the circuit to generate an air mass flow-indicating signal.

While having proven advantages, such conventional hot wire air mass sensors are frequently expensive, and when used in a harsh environment such as exists in an air induction system of an internal-combustion engine, are inaccurate, unreliable and subject to resistive wire breakage. If the air mass sensor utilizes a bent resistive wire, as have many sensors in the past, the wire is prone to breakage at each bend when heated during sensor operation. Typically, the resistive wire of an air mass sensor operates at temperatures around 250° C., and at such an extremely elevated temperature, resistive wire such as platinum wire becomes brittle in the area of the bend and easily breaks when exposed to vibration and airflow forces.

Even a straight length of heated resistive wire will frequently break when subjected to the vibration and airflow forces encountered in an air induction system of an internal-combustion engine. To minimize the airflow force on the wire, in the past, the wire has been positioned adjacent the passageway walls or in a by-pass duct. Sampling from the air mass flow adjacent to the walls of the air passageway, however, is not representative of the true air mass flow through the passageway due to the drag and turbulence occurring along the walls. Sampling in a by-pass channel is unsatisfactory for similar reasons. Furthermore, when a very low air mass flow is to be sampled, the flow along the walls or in a by-pass duct may not be sufficient to provide an accurate measurement. Hot wire air mass sensors require a minimum air mass flow to operate with an acceptable degree of accuracy.

While it is desirable to sample the air mass flow in the central portion of a passageway, it has proven difficult to do so with a hot wire air mass sensor. If the resistive wire is placed directly in the central portion of the passageway, it is exposed to the airflow having the greatest velocity and exerting the greatest force on the wire. For a typical automobile engine, an air mass sensor must be able to measure air mass flows ranging from 30 to 1,350 pounds per hour. Additionally, the airflow in the passageway in an automobile induction system is far from laminar and unidirectional. As a result of back pressures created by exhaust valves opening and closing, the airflow in the passageway may momentarily reverse direction and apply a significant reverse direction force on the resistive wire.

Another consideration becomes apparent upon a cross-sectional analysis of the airflow in the passageway which indicates that the speed and direction of the airflow varies across the diameter of the passageway and, as discussed above, changes with time. A boundary layer of air along the passageway walls generally flows slower and at any instant of time may be flowing in a direction opposite from that of an adjacent intermediate layer of air which surrounds the airflow in the central portion of the passageway. This intermediate layer, at any instant, may be flowing in a direction and speed different from that of the central airflow. In a conventional automobile engine, this phenomenon is often accompanied by the occurrence of a resonating airflow in the air induction passageway. Consequently, the airflow may apply oppositely directed forces of various magnitudes along the length of a resistor wire if it extends across more than one airflow layer and those forces may periodically change in direction. A resistive wire subjected to such a resonating airflow will itself resonate in response thereto, and the resulting movement of the wire may be sufficient to eventually break it, especially when coupled with the mechanical vibration usually present in an automobile engine.

It will therefore be appreciated that there has been a significant need for a hot wire air mass sensor capable of measuring the air mass flow in the central portion of a passageway and constructed to withstand the vibration and airflow forces typically encountered in an air induction system of an internal-combustion engine. The air mass sensor should be inexpensive, operate at elevated temperatures, provide accurate measurements at low and high air mass flows, and be reliable. The present invention fulfills this need and, further, provides other related advantages.

DISCLOSURE OF INVENTION

The present invention resides in a hot wire sensor usable in the measurement of air mass flow in a conduit, including a length of temperature-dependent resistive wire; a rigid support member mountable on the exterior of the conduit; and a pair of electrically conductive, resilient posts having wire-supporting end portions fixedly connected to the wire, the end portions being spaced apart and positionable in a central portion of the conduit, and biased away from each other to hold the wire under tension, each of the posts further having a remote end portion extendable through an opening in the conduit wall and fixedly held by the support member. The support member includes electrically nonconductive post support means for fixedly holding the remote end portions and preventing their electrical contact with the support member. The sensor connects to a circuit board for holding at least a portion of the electronic circuitry used when the sensor is operation to maintain the wire at a substantially constant temperature and generate an air mass flow-indicating signal based upon the air mass flow in the conduit sampled by the wire. The circuit board is mountable on the exterior of the conduit.

More specifically, the support member includes a support plate having a pair of spaced-apart openings and being fixedly attached to the circuit board. The post support means includes a pair of electrically nonconductive support inserts fixedly retained within the openings in the support plate for fixedly holding the remote end portions of the posts. The remote end portions are electrically connected to the electronic circuitry.

The circuit board is attachable to the conduit at a plurality of longitudinally spaced and aligned points along the conduit exterior. Electrically nonconductive means are provided for sealing the opening in the conduit wall through which each of the posts extends. The resistive wire is composed of platinum having a tensile strength of about 0.4 pound. The posts have sufficient length to position the resistive wire in the central portion of the conduit at least 33⅓% of the conduit diameter from the interior walls of the conduit. The posts are composed of phosphorus bronze spring wire.

Other features and advantages of the invention will become apparent from the following detailed description, taken in conjunction with the accompanying drawings.

BEST MODE FOR CARRYING OUT THE INVENTION

Figure 1:
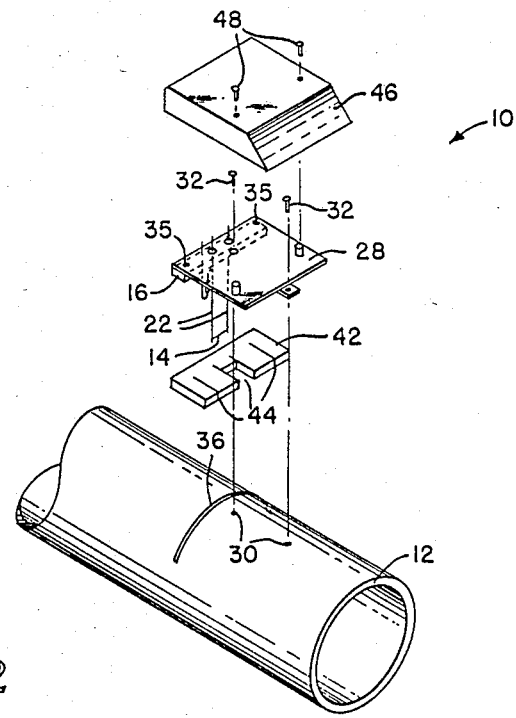
FIG. 1 is an exploded isometric view of a hot wire anemometer embodying the present invention.

As shown in the drawings for purposes of illustration, the present invention is embodied in an electronic anemometer, indicated generally by reference numeral 10, for measuring the mass of air flowing through a passageway or conduit 12.

In accordance with the invention, the sensor portion of the anemometer 10 includes a straight length of temperature-dependent resistive wire 14, a rigid support plate 16 with a pair of spaced-apart openings 18 therethrough, a pair of electrically nonconductive support inserts 20 fixedly retained within the openings, and a pair of electrically conductive, resilient posts 22, each post being connected to the wire at a wire-supporting end portion 24 and fixedly held at a remote end portion 26 by one of the inserts. The anemometer 10 of the invention further includes a circuit board 28 fixedly attached to the support plate 16 and holding at least a portion of the electronic circuitry 29, indicated in schematic form in FIG. 3, used when the anemometer is operating. The circuitry 29 maintains the resistive wire 14 at a substantially constant temperature and generates an air mass flow-indicating signal based upon the air mass flow in the conduit 12 sampled by the wire.

More specifically, the wire-supporting end portions 24 of the posts 22 are spaced apart and positionable in a central portion of the conduit 12, with the wire 14 substantially transverse to the airflow in the conduit. The wire-supporting end portions 24 are biased away from each other to hold the resistive wire 14 extending therebetween under a preset tension, thereby reducing the wire movement and wire breakage resulting from vibration and airflow forces in the conduit 12. A sufficient preset tension is applied to minimize the movement of the resistive wire 14, but yet not so great as to stretch the wire.

The posts 22 are manufactured of phosphorous bronze spring wire, which provides the necessary resiliency to allow the posts to flex somewhat under the forces encountered during operation of the anemometer 10 and dampen out vibrations and movements of the resistive wire 14. The use of such material for the posts 22 also provides the capability to withstand the temperature of the airflow and the elevated operating temperature of the resistive wire while maintaining the preset tension on the wire. A typical anemometer circuit will supply from 0.5 to 1.5 amperes of current to the resistive wire 14, all of which must be conducted through the posts 22.

The circuit board 28 is mountable on the exterior of the conduit 12 at a plurality of points 30 longitudinally aligned and spaced along the exterior of the conduit by removable fasteners 32. The support plate 16 is attached to a face 34 of the circuit board 28 by a plurality of fasteners 35 along one edge of the board, and comprises an elongated plate of a length coextensive with the length of the board. When the circuit board 28 is mounted to the conduit 12, the support plate 16 is positioned between the board and the conduit, with the circuit board oriented to position the support plate substantially perpendicular to the longitudinal axis of the conduit.

While the anemometer 10 is mounted to the conduit 12 by the circuit board 28, the rigidity of the support plate 16 maintains the relative positioning of the posts 22, which, as noted above, are biased to hold the resistive wire 14 under tension. The rigidity of the support plate 16 is also necessary because any lateral movement of the remote end portions 26 would be magnified at the wire-supporting end portions 24 and could result in breakage of the resistive wire 14. It is noted that by using a rigid support plate 16 and mounting the anemometer 10 to the conduit 12 by the relatively flexible circuit board 28, slight inadvertent movement of the circuit board, such as by a repairman, will result in the movement of the entire anemometer as a unit and produce no relative movement between the posts 22 which could break the resistive wire 14.

The support plate 16 is manufactured of a high strength alloy such as aluminum to withstand the forces on the individual posts 22 resulting from their biasing and from vibration and airflow forces during operation. Practice has proven that these forces are sufficiently large to crack and damage the circuit board 28 if the posts 22 are mounted directly thereto, and the force necessary to maintain the wire 14 under its preset tension difficult to maintain by the flexible circuit board.

Figure 2:
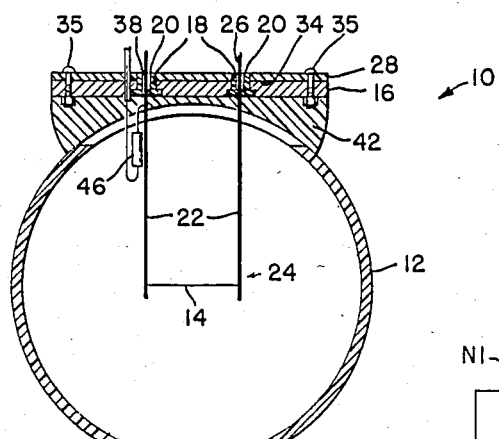
FIG. 2 is an enlarged sectional view of the anemometer shown in FIG. 1.

The posts 22 are spaced apart to prevent electrical contact with another, and have sufficient length to extend form the support plate 16, which is positioned external to the conduit 12, through an opening 36 in the conduit wall and into the central portion of the conduit. It is preferred that the posts 22 position the resistive wire 14 in the central portion of the conduit 12, at least 33⅓% of the conduit diameter from the interior walls of the conduit. As shown in FIG. 2, the resistive wire 14 is positioned to extend an equal distance to each side of a diameter line of the conduit 12 at a right angle relative to the diameter line. The posts 22 are manufactured of 0.032 inch diameter straight stock spring wire, which presents little interference with the airflow in the conduit 12 and provides a minimally intrusive sensor.

A straight length of the resistive wire 14 is soldered at its ends to the wire-supporting end portions 24 of the posts 22. Alternatively, the end portions 24 may be cut lengthwise to receive the wire and crimped about the wire to hold it in place. In either case, the posts 22 of the present invention eliminate the need for looping or bending of the resistive wire, or stretching a relatively long and flexible length of wire completely across the diameter of the conduit 12. Consequently, the chafing, heating at bends, and movement of the resistive wire which in the past have contributed to wire breakage are avoided.

In addition, when using expensive platinum wire for the resistive wire 14, the present invention permits use of a short, straight length of platinum wire extending between the posts 22, which minimizes the length of platinum wire required, thereby substantially reducing the cost of manufacturing the anemometer 10. It also permits the designer to select the precise length of resistive wire 14 which he desires to use to sample the airflow.

In the presently preferred embodiment of the invention, the resistive wire 14 is manufactured of 99.99% pure hard platinum wire of 0.003 inch diameter, with a tensile strength of 0.4 pound. The resistive wire 14 is 0.8 or 1.6 inches in length, and is held between the wire-supporting end portions 24 of the posts 22 under 3.5 grams of tension preset during assembly of the anemometer 10. The length of the resistive wire 14 is preferably limited to restrict sampling of the air mass flow to the central portion of the airflow where it is more laminar and representative of the airflow in the conduit.

The remote end portions 26 of the posts 22 are held electrically insulated from the support plate 16 by the inserts 20. The inserts 20 are cylindrical in shape and sized to fit snugly within the openings 28 in the support plate 16. Each insert 20 has a centrally disposed aperture 38 extending therethrough which is sized to receive and firmly grip the remote end portion 26 of one of the posts 22. The inserts are manufactured of NEMA G10 rod. Such a resin-based fiberglass material has sufficient strength and rigidity to hold the posts 22 in their relative positions.

The remote end portions 26 of the posts 22 extend completely through the inserts 20 and through a pair of corresponding apertures 40 in the circuit board 28. The remote end portions 26 are soldered or otherwise electrically connected to metallic contact strips (not shown) on the circuit board 28 which are connected to the appropriate portion of the electronic circuitry 29 for the anemometer 10.

For convenience, the opening 36 in the conduit wall through which the posts 22 pass is cut as an elongated slot. To prevent the escape or entry of air through the opening 36 around the posts 22, a block 42 of closed-cell foam is positioned over the opening and held in place between the circuit board 28 and support plate 16, and the conduit 12. When the circuit board 28 is mounted to the conduit 12, the block 42 is compressed to seal the opening 36. The block 42 had cuts 44 to receive the posts 22 and one of the fasteners 32, and to improve the seal.

Figure 3:
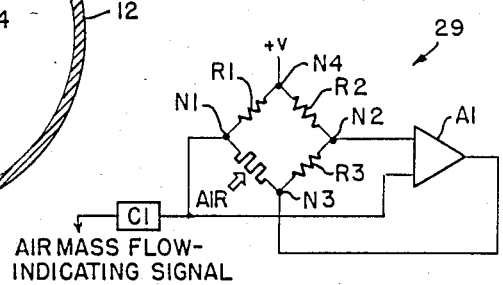
FIG. 3 is a schematic diagram for the basic circuitry for the anemometer shown in FIG. 1.

The basic circuitry 29 used with the anemometer of the present invention is shown in FIG. 3, and includes placing the resistive 14 as one branch in a bridge circuit with resistors R1-R3. The two inputs of an amplifier A1 are connected to opposite diagonal nodes N1 and N2 of the bridge. The output of the amplifier is connected to another diagonal node N3 of the bridge, and a power source +V is connected to the remaining diagonal node N4. The resulting feedback circuit maintains the resistive wire 14 at a constant temperature by changing the current therethrough to compensate for the different cooling effects of the airflow in the conduit 12. A current amplifier C1, with its input connected to the node N1, produces an air mass flow-indicating signal.

Although not shown in the circuitry schematic, a positive temperature coefficient resistor (posistor) 46 is positioned adjacent one of the posts 22 inside the conduit 12 to sense and compensate for the ambient temperature of the airflow. The opening 36 is cut wide enough to allow the posistor 46 to pass through the slot during assembly of the anemometer 10. The circuitry 29 is protected by a cover 46 attached to the circuit board 28 by a plurality of removable fasteners 48.

While described herein as an anemometer for the measurement of air mass flow, with well-known changes in circuitry the hot wire sensor structure of the present invention may be used in devices to measure the speed or force of airflow in a conduit, such as in wind gauges for use on boats and airplanes.

From the foregoing, it will be appreciated that the invention, as described herein for purposes of illustration, provides an accurate, reliable, and relatively inexpensive hot wire air mass sensor which can measure air mass flow in the central portion of a conduit. It will also be appreciated that although a specific embodiment of the invention is described herein for purposes of illustration, various modifications may be made without departing from the spirit and scope of the invention. Accordingly, the invention is not limited except as by the appended claims.

I claim:

1. An electronic anemometer for measuring air mass flow in a conduit, comprising:
    a straight length of temperature-dependent resistive wire;
    a circuit board for holding at least a portion of the electronic circuitry used when the anemometer is operating to maintain said wire at a substantially constant temperature and generate an air mass flow-indicating signal based upon the air mass flow in the conduit sampled by said wire;
    a rigid support plate having a pair of spaced-apart openings, said plate being fixedly attached to said circuit board;
    a pair of electrically nonconductive support inserts, each of said inserts being fixedly retained within one of said openings in said support plate; and
    a pair of electrically conductive, resilient posts capable of withstanding the elevated operating temperatures encountered when the anemometer is operating, each of said posts having a wire-supporting end portion fixedly connected to said wire, said end portions being spaced apart and positionable in a central portion of the conduit with said wire substantially transverse to the airflow, said end portions being biased away from each other to hold said wire under tension, each of said posts further having a remote end portion fixedly held by one of said support inserts, said remote end portion being electrically connected to the electronic circuitry.

2. The anemometer of claim 1 wherein said circuit board is attachable to the conduit at a plurality of longitudinally spaced and aligned points along the conduit.

3. The anemometer of claim 1 wherein said resistive wire is composed of platinum.

4. The anemometer of claim 3 wherein said platinum wire has a tensile strength of about 0.4 pound.

5. The anemometer of claim 1 wherein said posts are composed of phosphorous bronze spring wire.

6. The anemometer of claim 1 wherein said posts have sufficient length to position said resistive wire in the central portion of the conduit at least 33⅓% of the conduit diameter from the interior walls of the conduit.

7. The anemometer of claim 6 wherein said resistive wire extending between said wire-supporting end portions is of a length extending within said central portion.

8. An electronic anemometer for measuring air mass flow in a conduit, comprising:
 a length of temperature-dependent resistive wire;
 a circuit board for holding at least a portion of the anemometer electronic circuitry;
 a rigid support member, said circuit board being attached to said member; and
 a pair of electrically conductive, resilient posts capable of withstanding the elevated operating temperatures encountered when the anemometer is operating, each of said posts having a wire-supporting end portion fixedly connected to said wire, said end portions being spaced apart and positionable in the conduit, and biased away from each other to hold said wire under tension, each of said posts further having a remote end portion fixedly held by said support member, said remote end portions being electrically connected to the electronic circuitry.

9. The anemometer of claim 8 wherein said support member includes electrically nonconductive post support means for fixedly holding said remote end portions and preventing their electrical contact with said support member.

10. An electronic anemometer for measuring air mass flow, comprising:
 a conduit;
 a straight length of temperature-dependent resistive wire;
 a circuit board for holding at least a portion of the electronic circuitry used when the anemometer is operating to maintain said wire at a substantially constant temperature and generate an air mass flow-indicating signal based upon the air mass flow in said conduit sampled by said wire;
 a rigid support plate having a pair of spaced-apart openings, said plate being fixedly attached to said circuit board;
 a pair of electrically nonconductive support inserts, each of said inserts being fixedly retained within one of said openings in said support plate; and
 a pair of electrically conductive, resilient posts capable of withstanding the elevated operating temperatures encountered when the anemometer is operating, each of said posts having a wire-supporting end portion fixedly connected to said wire, said end portions being spaced apart and positioned in a central portion of said conduit with said wire substantially transverse to the direction of airflow therein, said end portions being biased away from each other to hold said wire under tension, each of said posts further having a remote end portion fixedly held by one of said support inserts, said remote end portions being electrically connected to the electronic circuitry.

* * * * *